US010173516B2

(12) United States Patent
Tseng et al.

(10) Patent No.: US 10,173,516 B2
(45) Date of Patent: Jan. 8, 2019

(54) METHOD FOR CONTROLLING OPERATING MODES OF A HYBRID POWERTRAIN MECHANISM

(71) Applicant: INDUSTRIAL TECHNOLOGY RESEARCH INSTITUTE, Hsinchu (TW)

(72) Inventors: Jui-Tang Tseng, Hsinchu (TW); Yun-Jui Chung, Hsinchu (TW); Ching-Huei Wu, Hsinchu (TW); Sheng-Feng Tsai, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/583,209

(22) Filed: May 1, 2017

(65) Prior Publication Data
US 2017/0232832 A1   Aug. 17, 2017

Related U.S. Application Data

(62) Division of application No. 14/945,986, filed on Nov. 19, 2015, now Pat. No. 9,676,266.

(30) Foreign Application Priority Data

Dec. 22, 2014   (TW) .............................. 103144720 A

(51) Int. Cl.
*F16H 3/66* (2006.01)
*B60K 6/445* (2007.10)
(Continued)

(52) U.S. Cl.
CPC .............. *B60K 6/445* (2013.01); *B60K 6/365* (2013.01); *B60K 6/387* (2013.01); *B60K 6/40* (2013.01);
(Continued)

(58) Field of Classification Search
None
See application file for complete search history.

(56) References Cited

U.S. PATENT DOCUMENTS 5,846,155 A * 12/1998 Taniguchi ................ B60K 6/48
477/2
5,904,631 A    5/1999 Morisawa et al.
(Continued)

FOREIGN PATENT DOCUMENTS

CN    201501287 U    6/2010
CN    202152008 U    2/2012
(Continued)

OTHER PUBLICATIONS

Chan, The state of the art of electric and hybrid vehicles; Proceedings of the IEEE; 2002; pp. 247-275.
(Continued)

*Primary Examiner* — Dirk Wright
(74) *Attorney, Agent, or Firm* — Rabin & Berdo, P.C.

(57) ABSTRACT

A method for controlling operating modes of a hybrid powertrain mechanism including a first epicyclic train having first and second sun gears and a planetary gear couplable to these sun gears; a second epicyclic train having third and fourth sun gears and a planetary gear couplable to these sun gears; a first electric machine having one end coupled to the second sun gear; a second electric machine having one end coupled to the fourth sun gear; a first clutch having one end coupled to another end of the first electric machine; a first brake having one end coupled to another end of the first clutch and another end coupled to the third sun gear; and an engine coupled to the first sun gear. Various driving modes are provided by changing the states of the first clutch and the first brake and the operating modes of the first and second electric machines.

5 Claims, 8 Drawing Sheets

(51) Int. Cl.
*B60K 6/365* (2007.10)
*B60K 6/387* (2007.10)
*B60K 6/40* (2007.10)
*F16H 3/72* (2006.01)
*F16H 3/56* (2006.01)
*B60K 6/38* (2007.10)

(52) U.S. Cl.
CPC .............. *F16H 3/66* (2013.01); *F16H 3/728* (2013.01); *B60K 2006/381* (2013.01); *B60Y 2200/92* (2013.01); *B60Y 2300/182* (2013.01); *B60Y 2300/70* (2013.01); *B60Y 2400/73* (2013.01); *F16H 3/56* (2013.01); *F16H 2200/2007* (2013.01); *F16H 2200/2035* (2013.01); *Y02T 10/6234* (2013.01); *Y02T 10/6239* (2013.01); *Y10S 903/91* (2013.01); *Y10S 903/911* (2013.01)

(56) References Cited

U.S. PATENT DOCUMENTS

| | | | |
|---|---|---|---|
| 5,935,035 A | 8/1999 | Schmidt | |
| 5,951,614 A * | 9/1999 | Tabata | B60K 6/48 180/65.25 |
| 6,019,699 A * | 2/2000 | Hoshiya | B60K 6/365 477/15 |
| 6,155,364 A | 12/2000 | Nagano et al. | |
| 6,468,175 B1 | 10/2002 | Lehongre | |
| 6,527,659 B1 | 3/2003 | Klemen et al. | |
| 6,551,208 B1 | 4/2003 | Holmes et al. | |
| 6,945,894 B2 | 9/2005 | Holmes | |
| 7,037,230 B2 * | 5/2006 | Dupriez | F16H 3/72 180/65.235 |
| 7,311,631 B2 | 12/2007 | Kushino | |
| 7,389,168 B2 * | 6/2008 | Imazu | B60K 6/365 475/5 |
| 7,568,990 B2 | 8/2009 | Sah et al. | |
| 7,686,723 B2 | 3/2010 | Schondorf | |
| 7,892,128 B2 | 2/2011 | Schondorf | |
| 8,396,634 B2 * | 3/2013 | Heap | B60K 6/445 475/5 |
| 8,585,532 B2 * | 11/2013 | Hwang | F16H 3/72 475/207 |
| 8,585,533 B2 * | 11/2013 | Hwang | F16H 3/72 475/207 |
| 8,790,202 B2 * | 7/2014 | Sakai | B60K 6/365 475/5 |
| 8,870,706 B2 * | 10/2014 | Imamura | B60K 6/365 475/282 |
| 8,905,892 B1 * | 12/2014 | Lee | B60K 6/42 475/317 |
| 8,911,316 B2 * | 12/2014 | Lee | B60K 6/365 475/5 |
| 9,174,523 B2 * | 11/2015 | Lee | B60K 6/42 |
| 9,266,418 B2 * | 2/2016 | Lee | B60K 6/365 |
| 9,340,099 B2 * | 5/2016 | Hwang | F16H 3/727 |
| 9,604,525 B2 * | 3/2017 | Tabata | B60K 6/547 |
| 2002/0061802 A1 | 5/2002 | Chung | |
| 2014/0148292 A1 | 5/2014 | Lee et al. | |

FOREIGN PATENT DOCUMENTS

| | | |
|---|---|---|
| CN | 102421618 A | 4/2012 |
| TW | M245089 U | 10/2004 |
| TW | I308887 B | 4/2009 |
| TW | I411735 B | 10/2013 |

OTHER PUBLICATIONS

Deball et al., Development of a Post-Transmission Hybrid Powertrain; International Battery, Hybrid and Fuel Cell Electric Vehicle Symposium; 2009; pp. 1-7.

Yang et al., Intergrated Electro-Mechanical Transmission Systems in Hybrid Electric Vehicles; Vehicle Power and Propulsion Conference; 2011; pp. 1-6.

Wang et al., Review of Electronic-continuously Variable Transmission Propulsion System for Full Hybrid Electric Vehecles; Journal of Asian Electric Vehicles; 2009; pp. 1297-1302.

Mir-Nasiri et al., New Intelligent Transmission Concept for Hybrid Mobile Robot Speed Control; International Journal of Advanced Robotic Systems; 2005; pp. 259-263.

Elmarakbi et al., Epicyclic Power Split Transmissions for Hybrid Electric Vehicles: Fuel Consumption, Vehicle Performance and Driving Aggressiveness; Global journal of Researches in Engineering Automotive Engineering; 2013; pp. 1-10.

* cited by examiner

METHOD FOR CONTROLLING OPERATING MODES OF A HYBRID POWERTRAIN MECHANISM

CROSS-REFERENCE TO RELATED APPLICATIONS

This application is a divisional of co-pending application Ser. No. 14/945,986, filed on Nov. 19, 2015, and the right of priority of parent application is and was claimed under 35 U.S.C. § 119 of Taiwanese Patent Application No. 103144720, filed on Dec. 22, 2014. The entirety of the above-mentioned patent application is hereby incorporated by reference herein and made a part of this specification.

BACKGROUND

1. Technical Field

The present disclosure relates to hybrid powertrain mechanisms, and more particularly, to a hybrid powertrain mechanism having a plurality of driving modes.

2. Description of Related Art

In a hybrid powertrain mechanism, an engine that has preferred performance at higher speed and has an advantage of convenient energy supply is combined with an electric motor that has preferred performance at lower speed and has advantages of low pollution and low noise. Such a combination can be a serial system or a parallel system. In a parallel system, power can be outputted from either the engine or the electric motor. Also, power can be outputted from both the engine and the electric motor so as to generate a larger output power. Therefore, the parallel system has better system efficiency than the serial system. A key point in the parallel system is the mechanical design of the hybrid powertrain mechanism However, in the mechanical design of the conventional hybrid powertrain mechanism, epicyclic trains are usually not connected to clutches and only used as movement components for power transmission. As such, a hybrid power transmission effect cannot be achieved.

Further, internal gears and bevel gears are generally used in the epicyclic trains of the conventional hybrid powertrain mechanism. However, fabrication of the internal gears and bevel gears is very difficult and time consuming, thus increasing the difficulty, time and cost of fabricating the conventional hybrid powertrain mechanism.

Therefore, how to overcome the above-described drawbacks has become critical.

SUMMARY

In view of the above-described drawbacks, the present disclosure provides a hybrid powertrain mechanism, which comprises: a first epicyclic train comprising a first sun gear, a second sun gear and a first planetary gear to be coupled to the first sun gear and the second sun gear; a second epicyclic train comprising a third sun gear, a fourth sun gear and a second planetary gear to be coupled to the third sun gear and the fourth sun gear; a first electric machine having one end coupled to the second sun gear; a second electric machine having one end coupled to the fourth sun gear; a first clutch having one end coupled to another end of the first electric machine; a first brake having one end coupled to another end of the first clutch and another end coupled to the third sun gear; and an engine coupled to the first sun gear. The hybrid powertrain mechanism can further comprise a third clutch having one end coupled to the engine and another end coupled to the first sun gear.

The present disclosure further provides a transmission method for controlling operating modes of a hybrid powertrain mechanism. The hybrid powertrain mechanism comprises a first epicyclic train, a second epicyclic train, a first electric machine, a second electric machine, a first clutch, a first brake and an engine. The method comprises: releasing the first clutch; and engaging the first brake to generate an operating mode that is selected from: a second electric mode, wherein when the engine is stopped, the first electric machine is started as a power source to output power through the first epicyclic train and cause the engine to idle, and the second electric machine is started to drive the second epicyclic train to output power; a third hybrid mode, wherein the engine is started as a power source to output power through the first epicyclic train, the first electric machine is started to output power through the first epicyclic train, and the second electric machine is started as a power source to drive the second epicyclic train to output power; or a fourth engine mode, wherein the engine is started as a power source to output power through the first epicyclic train, but neither the first electric machine nor the second electric machine is started to serve as a power source, instead, the first electric machine or the second electric machine serves as a generator.

The present disclosure further provides a second transmission method for controlling operating modes of a hybrid powertrain mechanism. The hybrid powertrain mechanism comprises a first epicyclic train, a second epicyclic train, a first electric machine, a second electric machine, a first clutch, a first brake and an engine. The method comprises: engaging the first clutch; and releasing the first brake to generate an operating mode that is an optimum engine mode, wherein the first electric machine or the second electric machine serves as a generator or a motor so as to cause the engine to operate under an optimum rotating speed according to the rotating speed of the first electric machine or the second electric machine.

The present disclosure further provides a third transmission method for controlling operating modes of a hybrid powertrain mechanism. The hybrid powertrain mechanism comprises a first epicyclic train, a second epicyclic train, a first electric machine, a second electric machine, a first clutch, a first brake, a third clutch and an engine. The method comprises: releasing the first clutch; engaging the first brake; and engaging the third clutch to generate an operating mode that is selected from: a second electric mode, wherein when the engine is stopped, the first electric machine is started as a power source to output power through the first epicyclic train and cause the engine to idle, and the second electric machine is started to drive the second epicyclic train to output power; a third hybrid mode, wherein the engine is started as a power source to output power through the first epicyclic train, the first electric machine is started to output power through the first epicyclic train, and the second electric machine is started as a power source to drive the second epicyclic train to output power; or a fourth engine mode, wherein the engine is started as a power source to output power through the first epicyclic train, but neither the first electric machine nor the second electric machine is started to serve as a power source, instead, the first electric machine or the second electric machine serves as a generator.

The present disclosure further provides a fourth transmission method for controlling operating modes of a hybrid powertrain mechanism. The hybrid powertrain mechanism comprises a first epicyclic train, a second epicyclic train, a first electric machine, a second electric machine, a first clutch, a first brake, a third clutch and an engine. The method comprises: engaging the first clutch; releasing the first brake; and engaging the third clutch to generate a second electric mode, wherein the engine is not started, the first electric machine is started as a power source to output power through the first epicyclic train and cause the engine to idle, and the second electric machine is started as a power source to drive the second epicyclic train to output power; a third hybrid mode, wherein the engine is started to output power through the first epicyclic train, the second electric machine is started to drive the second epicyclic train to output power; or a fourth engine mode, wherein the engine is started, but neither the first electric machine nor the second electric machine is started to serve as a power source, instead, the first electric machine and the second electric machine serve as generators.

The present disclosure further provides a fifth transmission method for controlling operating modes of a hybrid powertrain mechanism. The hybrid powertrain mechanism comprises a first epicyclic train, a second epicyclic train, a first electric machine, a second electric machine, a first clutch, a first brake, a third clutch and an engine. The method comprises: releasing the first clutch; engaging the first brake; and releasing the third clutch to generate an operating mode that is a second electric mode, wherein when the engine is stopped, the first electric machine is started as a power source to output power through the first epicyclic train and the second electric machine is started to drive the second epicyclic train to output power.

DETAILED DESCRIPTION

The following illustrative embodiments are provided to illustrate the present disclosure, these and other advantages and effects can be apparent to those in the art after reading this specification. It should be noted that all the drawings are not intended to limit the present disclosure. Various modifications and variations can be made without departing from the spirit of the present disclosure.

Figure 1A:
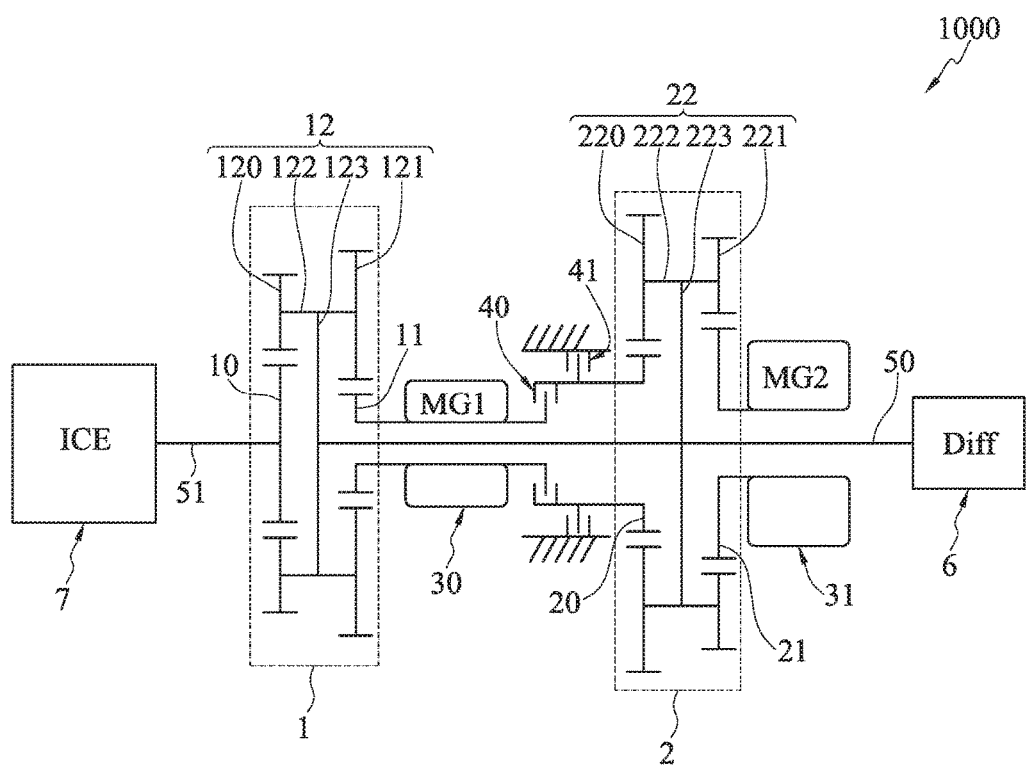
FIG. 1A is a schematic diagram of a hybrid powertrain mechanism according to a first embodiment of the present disclosure.
Figure 1B:
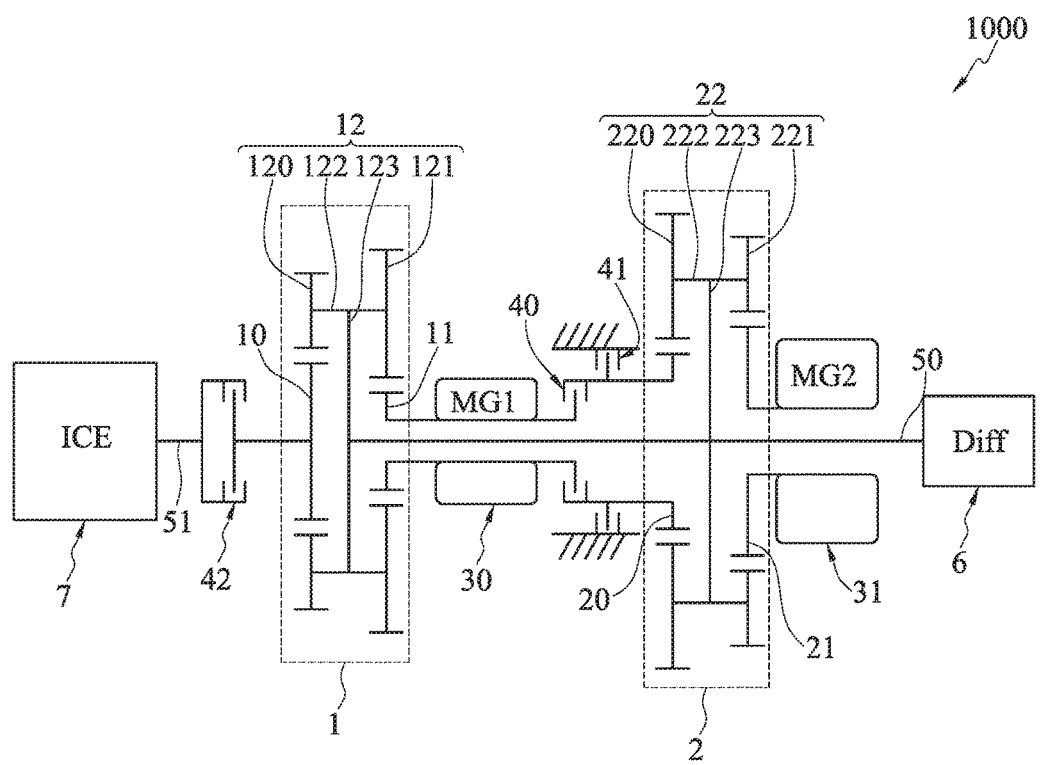
FIG. 1B is a schematic diagram of a hybrid powertrain mechanism according to a second embodiment of the present disclosure.

FIGS. 1A and 1B are schematic diagrams of a hybrid powertrain mechanism 1000 according to a first embodiment and a second embodiment of the present disclosure. Referring to FIG. 1A, the hybrid powertrain mechanism 1000 of the first embodiment has a first epicyclic train 1, a second epicyclic train 2, a first electric machine 30, a second electric machine 31, a first clutch 40, a first brake 41, a first transmission shaft 50, a second transmission shaft 51, a differential 6 and an engine 7. The second embodiment differs from the first embodiment in that the hybrid powertrain mechanism 1000 further has a third clutch 42.

Referring to FIG. 1A, the first epicyclic train 1 has a first sun gear 10, a second sun gear 11, and a first planetary gear 12 coupled to the first sun gear 10 and the second sun gear 11. The first planetary gear 12 has a first planetary gear 120, a second planetary gear 121, a first planetary shaft 122 coupled to the first planetary gear 120 and the second planetary gear 121, and a first planetary carrier 123 coupled to the first planetary shaft 122. The first planetary gear 120 is coupled to an outer periphery of the first sun gear 10, and the second planetary gear 121 is coupled to an outer periphery of the second sun gear 11.

The second epicyclic train 2 has a third sun gear 20, a fourth sun gear 21, and a second planetary gear 22 coupled to the third sun gear 20 and the fourth sun gear 21. The second planetary gear 22 has a third planetary gear 220, a fourth planetary gear 221, a second planetary shaft 222 coupled to the third planetary gear 220 and the fourth planetary gear 221, and a second planetary carrier 223 coupled to the second planetary shaft 222. The third planetary gear 220 is coupled to an outer periphery of the third sun gear 20, and the fourth planetary gear 221 is coupled to an outer periphery of the fourth sun gear 21.

One end of the first electric machine 30 is coupled to the second sun gear 11 so as to be connected to the first epicyclic train 1, and another end of the first electric machine 30 coupled to one end of the first clutch 40. Another end of the first clutch 40 is coupled to one end of the first brake 41. Another end of the first brake 41 is coupled to the third sun gear 20. One end of the second electric machine 31 is coupled to the fourth sun gear 21. The first brake is fixingly disposed. The first electric machine 30 and the first clutch 40 are disposed between the first epicyclic train 1 and the second epicyclic train 2.

The differential 6 is coupled to the first planetary carrier 123 and the second planetary carrier 223 through the first transmission shaft 50 so as to be coupled to the first epicyclic train 1 and the second epicyclic train 2. Further, a transmission mechanism such as a gear train can be disposed between the differential 6 and the first epicyclic train 1 and between the differential 6 and the second epicyclic train 2 for coupling the differential 6 to the first epicyclic train 1 and the second epicyclic train 2. That is, the connection relationship between the differential 6 and the first epicyclic train 1 and between the differential 6 and the second epicyclic train 2 can be varied according to the practical need and detailed description thereof is omitted herein.

The engine 7 is coupled to the first sun gear 10 through the second transmission shaft 51.

Therefore, the first epicyclic train 1, the second epicyclic train 2, the first clutch 40 and the first brake 41 constitute a hybrid powertrain mechanism. The first electric machine 30 and the second electric machine 31 can deliver power through the first epicyclic train 1 and the second epicyclic train 2. Further, by changing the states (engaged or released) of the first clutch 40 and the first brake 41, the operating modes of the first electric machine 30, the second electric machine 31, the engine 7 and the differential 6 can be adjusted, which will be detailed later.

Referring to FIG. 1B, the second embodiment differs from the first embodiment in that the third clutch 42 is provided between the first epicyclic train 1 and the engine 7. One end of the third clutch 42 is coupled to the engine 7 and another end of the third clutch 42 is coupled to the first sun gear 10 so as to be connected to the first epicyclic train 1. As such, when the third clutch 42 is released, the engine 7 that is not started will not be brought to idle by the first electric machine 30 or the second electric machine 31, thereby saving energy.

Figure 2:
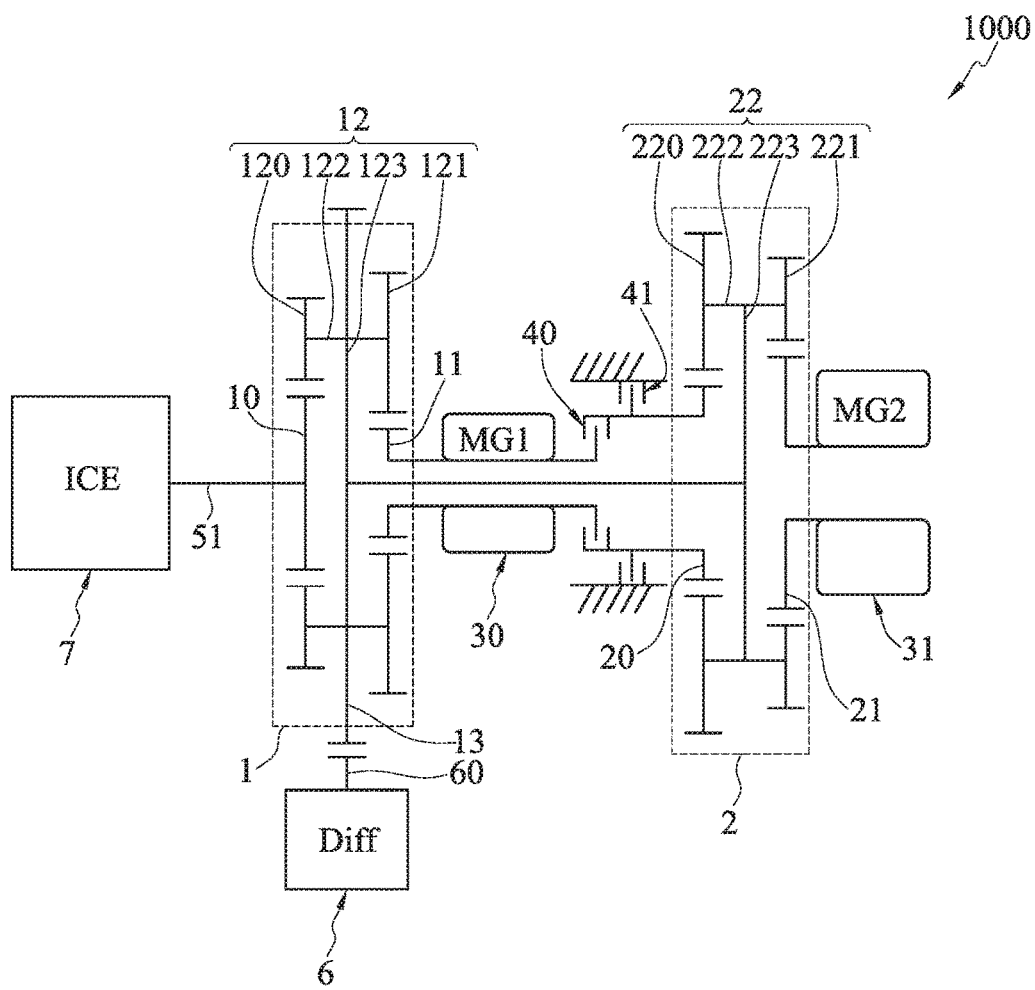
FIG. 2 is a schematic diagram of a hybrid powertrain mechanism according to a third embodiment of the present disclosure.
Figure 3:
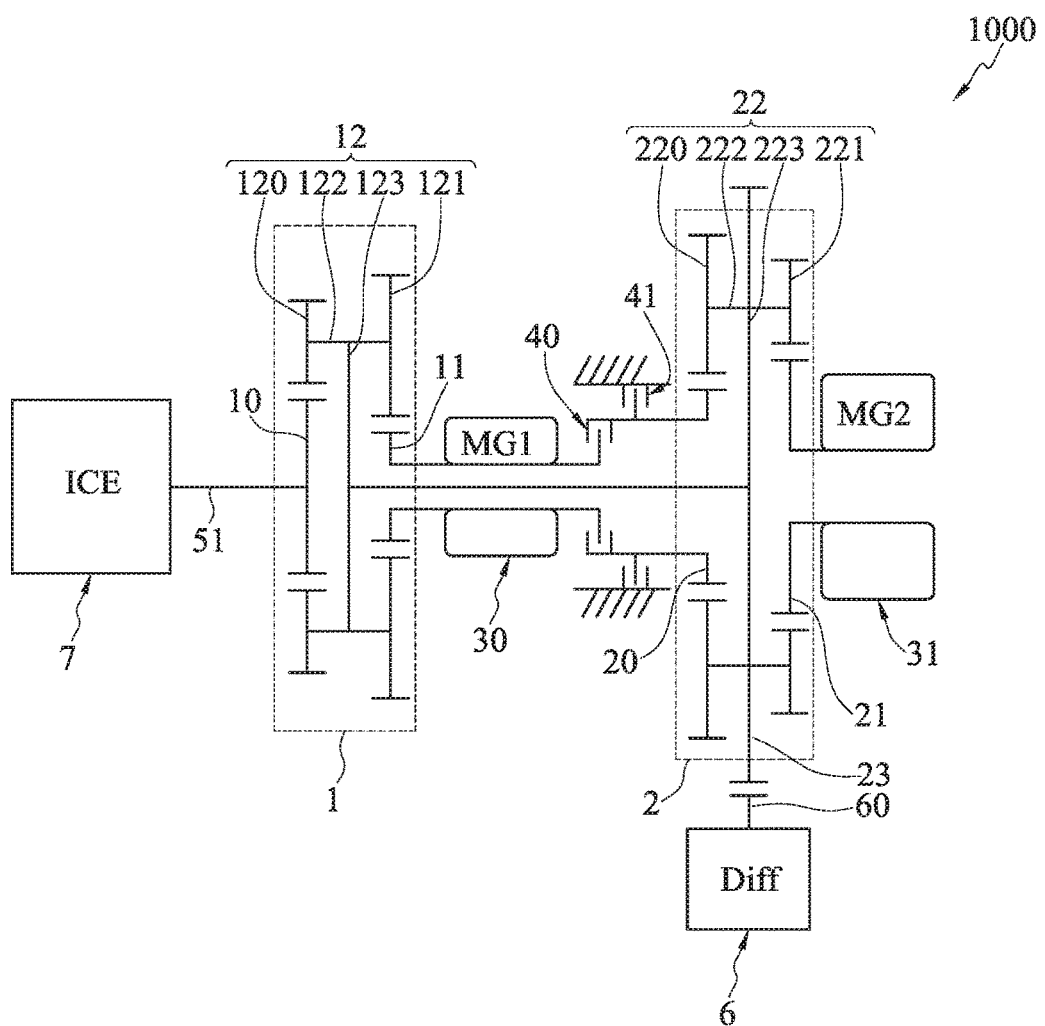
FIG. 3 is a schematic diagram of a hybrid powertrain mechanism according to a fourth embodiment of the present disclosure.

FIGS. 2 and 3 are schematic diagrams showing the hybrid powertrain mechanism 1000 according to a third embodiment and a fourth embodiment of the present disclosure. It should be noted that the third and fourth embodiments are based on the first embodiment. In the third and fourth embodiments, the connection relationship between the differential 6 and other components is changed.

Referring to FIG. 2, in the third embodiment, the first epicyclic train 1 further has a first connection gear 13 coupled to the first planetary gear 12, and the differential 6 further has a second connection gear 60 engaging with the first connection gear 13. As such, the differential 6 is connected to the first epicyclic train 1 and the operating state of the differential 6 can be changed through the first epicyclic train 1.

Referring to FIG. 3, in the fourth embodiment, the second epicyclic train 2 further has a third connection gear 23 coupled to the second planetary gear 22, and the differential 6 further has a second connection gear 60 engaging with the third connection gear 23. As such, the differential 6 is connected to the second epicyclic train 2 and the operating state of the differential 6 can be changed through the second epicyclic train 2.

In the first to fourth embodiments, the first epicyclic train 1, the second epicyclic train 2, the first electric machine 30, the second electric machine 31, the first clutch 40, the first brake 41, the third clutch 42, the differential 6 and the engine 7 are coaxially disposed so as to simplify the transmission space of the hybrid powertrain mechanism 1000.

Further, the hybrid powertrain mechanism 1000 of the present disclosure dispenses with the internal gears. In the first to fourth embodiments, the first sun gear 10, the second sun gear 11, the third sun gear 20, the fourth sun gear 21, the first planetary gear 120, the second planetary gear 121, the third planetary gear 220, the fourth planetary gear 220, the first connection gear 13, the second connection gear 60 and the third connection gear 23 are external gears. Compared with the internal gears, the external gears are easy to fabricate, thereby reducing the fabrication time. Also, the heat treatment deformation of the external gears is easy to control.

Therefore, the coaxial disposing of the components simplifies the transmission space of the hybrid powertrain mechanism 1000. Further, by dispensing with the internal gears, the present disclosure simplifies the fabrication process and reduces the fabrication cost.

Further, according to the first to fourth embodiments, the differential 6 can be coupled to at least one of the first planetary carrier and the second planetary carrier, thus allowing the hybrid powertrain mechanism 1000 to be designed according to the practical available space. Therefore, the design of the hybrid powertrain mechanism 1000 is very flexible and diversified.

Transmission methods of the hybrid powertrain mechanism 1000 of the present disclosure allow the hybrid powertrain mechanism 1000 to operate at different modes according to various operating states of an object, for example, a vehicle.

Figure 4A:
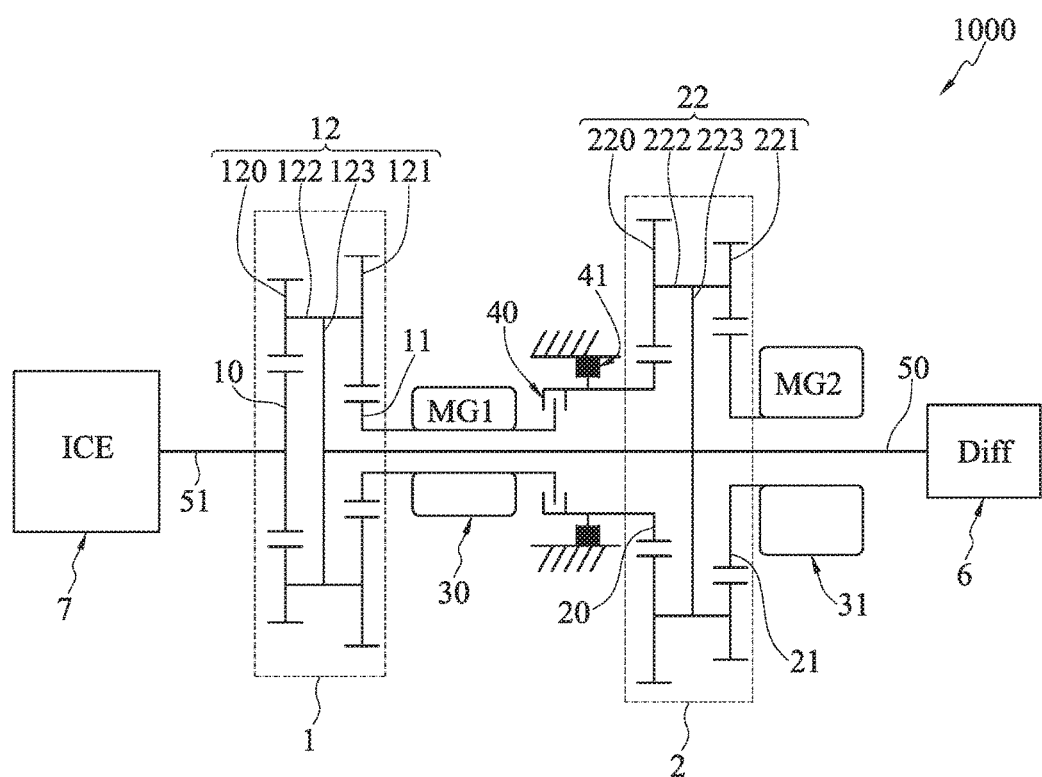
FIGS. 4A to 4D are schematic diagrams showing various driving modes of the hybrid powertrain mechanism of the present disclosure.

Referring to FIG. 4A, a first transmission method of the hybrid powertrain mechanism 1000 includes releasing the first clutch 40 and engaging the first brake 41 (indicated by a black block). Further, the engine 7, the first electric machine 30 and the second electric machine 31 are started, respectively, so as to generate different modes. In a first electric mode, neither the engine 7 nor the first electric machine 30 is started. But only the second electric machine 31 is started as a power source to drive the second epicyclic train 2 to output power to the differential 6. In a second electric mode, the engine 7 is not started. The first electric machine 30 is started as a power source. Through the first epicyclic train 1, the first electric machine 30 provides a torque to output power to the differential 6 and cause the engine to idle. Also, the second electric machine 31 is started to drive the second epicyclic train 2 to output power to the differential 6. In a third hybrid mode, the engine 7 is started as a power source. Through the first epicyclic train 1, the engine 7 provides a torque to output power to the differential 6. Also, the first electric machine 30 is started. Through the first epicyclic train 1, the first electric machine 30 provides a torque to output power to the differential 6. Further, the second electric machine 31 is started as a power source to drive the second epicyclic train 2 to output power to the differential 6. In a fourth engine mode, the engine 7 is started to output power through the first epicyclic train 1. But neither the first electric machine 30 nor the second electric machine 31 is started to serve as a power source. Instead, the first electric machine 30 and the second electric machine 31 can serve as generators. Therefore, the rotating speed of the engine can be adjusted according to different road conditions.

Figure 4B:
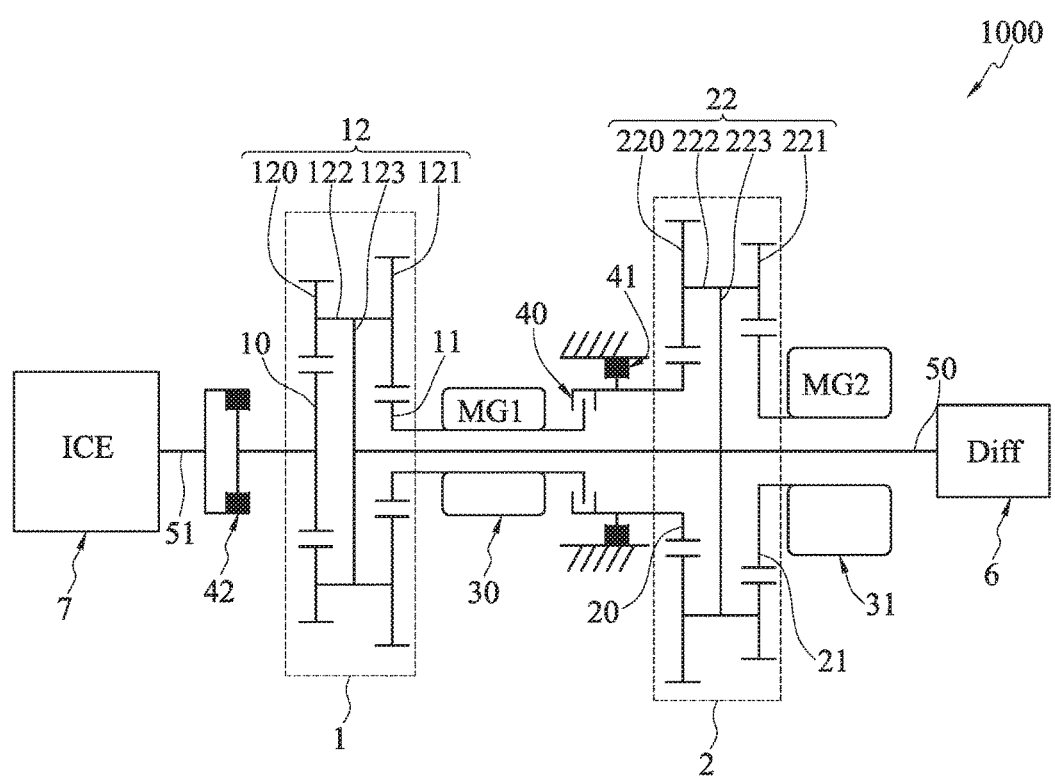

Referring to FIG. 4B, a second transmission method of the hybrid powertrain mechanism 1000 includes releasing the first clutch 40 and engaging and the first brake 41 and the third clutch 42. Since the third clutch 42 between the engine 7 and the electric machine 30 is engaged, the modes generated by the second transmission method are similar to FIG. 4A. Otherwise, if the third clutch 42 is released, different modes will be generated, which are detailed in FIG. 4D.

Figure 4C:
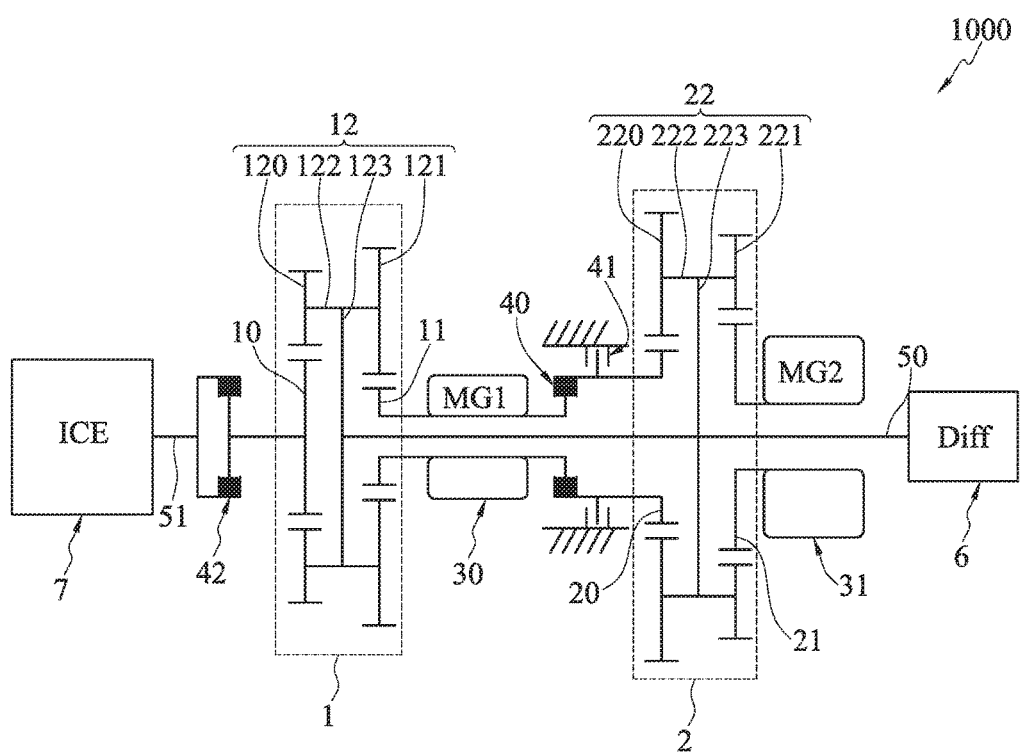

Referring to FIG. 4C, a third transmission method of the hybrid powertrain mechanism 1000 includes engaging the first clutch 40, releasing the first brake 41, and engaging the third clutch 42. In a first electric mode, neither the engine 7 nor the first electric machine 30 is started. But only the second electric machine 31 is started to drive the second epicyclic train 2 to output power to the differential 6. In a second electric mode, the engine 7 is not started. The first electric machine 30 is started as a power source. Through the first epicyclic train 1, the first electric machine 30 provides a torque to output power to the differential 6 and cause the engine to idle. The second electric machine 30 is started as a power source to drive the second epicyclic train 2 to output power to the differential 6. In a third hybrid mode, the engine 7 is started. Through the first epicyclic train 1, the engine 7 provides a torque to output power to the differential 6. Also, the second electric machine 31 is started to drive the second epicyclic train 2 to output power to the differential 6. In a fourth engine mode, the engine 7 is started. But neither the first electric machine 30 nor the second electric machine 31 is started to serve as a power source. Instead, the first electric machine 30 and the second electric machine 31 can serve as generators. Therefore, the rotating speed of the engine can be adjusted according to different road conditions.

Figure 4D:
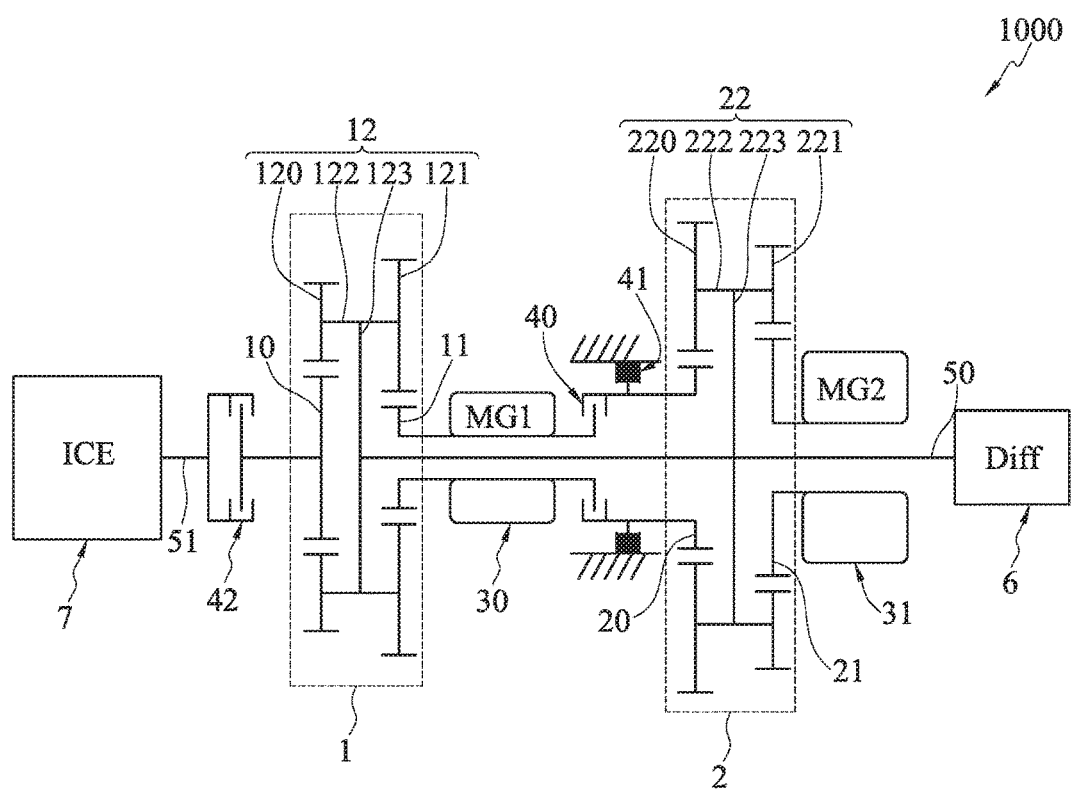

Referring to FIG. 4D, a fourth transmission method of the hybrid powertrain mechanism 1000 includes releasing the first clutch 40, engaging the first brake 41 and releasing the third clutch 42. Different from FIG. 4B, the third clutch 42 is released in FIG. 4D. Different from FIG. 4A, the third clutch 42 at a released state is provided between the engine 7 and the first electric machine 30 in FIG. 4D. As such, when the engine 7 is not started and the first electric machine 30 is started as a power source to provide a torque through the first epicyclic train 1, the engine 7 will not be brought to idle, thereby saving energy. The other operating modes of FIG. 4D are the same as FIG. 4A. Therefore, according to the transmission methods of the hybrid powertrain mechanism 1000, by changing the states (engaged or released) of the first clutch 40, the first brake 41 and the third clutch 42 and respectively starting the engine 7, the first electric machine 30 and the second electric machine 31 as a power source, the hybrid powertrain mechanism 1000 can operate at different modes corresponding to different driving states of the vehicle having the hybrid powertrain mechanism 1000 of the present disclosure.

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

What is claimed is:

1. A method for controlling operating modes of a hybrid powertrain mechanism including a first epicyclic train, a second epicyclic train, a first electric machine, a second electric machine, a first clutch, a first brake, and an engine, the method comprising:
   releasing the first clutch; and
   engaging the first brake to generate an operating mode that is selected from:
      a second electric mode, wherein when the engine is stopped, the first electric machine is started as a power source to output power through the first epicyclic train and cause the engine to idle, and the second electric machine is started to drive the second epicyclic train to output power;
      a third hybrid mode, wherein the engine is started as a power source to output power through the first epicyclic train, the first electric machine is started to output power through the first epicyclic train, and the second electric machine is started as a power source to drive the second epicyclic train to output power; or
      a fourth engine mode, wherein the engine is started as a power source to output power through the first epicyclic train, but neither the first electric machine nor the second electric machine is started to serve as a power source, instead, the first electric machine or the second electric machine serves as a generator.

2. A method for controlling operating modes of a hybrid powertrain mechanism including a first epicyclic train, a second epicyclic train, a first electric machine, a second electric machine, a first clutch, a first brake and an engine, the method comprising:
   engaging the first clutch; and
   releasing the first brake to generate an operating mode that is an optimum engine mode, wherein the first electric machine or the second electric machine serves as a generator or a motor so as to cause the engine to operate under an optimum rotating speed according to the rotating speed of the first electric machine or the second electric machine.

3. A method for controlling operating modes of a hybrid powertrain mechanism including a first epicyclic train, a second epicyclic train, a first electric machine, a second electric machine, a first clutch, a first brake, a third clutch and an engine, the method comprising:
   releasing the first clutch;
   engaging the first brake; and
   engaging the third clutch to generate an operating mode that is selected from:
      a second electric mode, wherein when the engine is stopped, the first electric machine is started as a power source to output power through the first epicyclic train and cause the engine to idle, and the second electric machine is started to drive the second epicyclic train to output power;
      a third hybrid mode, wherein the engine is started as a power source to output power through the first epicyclic train, the first electric machine is started to output power through the first epicyclic train, and the second electric machine is started as a power source to drive the second epicyclic train to output power; or
      a fourth engine mode, wherein the engine is started as a power source to output power through the first epicyclic train, but neither the first electric machine nor the second electric machine is started to serve as a power source, instead, the first electric machine or the second electric machine serves as a generator.

4. A method for controlling operating modes of a hybrid powertrain mechanism including a first epicyclic train, a second epicyclic train, a first electric machine, a second electric machine, a first clutch, a first brake, a third clutch and an engine, the method comprising:
   engaging the first clutch;
   releasing the first brake; and
   engaging the third clutch to generate an operating mode that is selected from:
      a second electric mode, wherein the engine is not started, the first electric machine is started as a power source to output power through the first epicyclic train and cause the engine to idle, and the second electric machine is started as a power source to drive the second epicyclic train to output power;
      a third hybrid mode, wherein the engine is started to output power through the first epicyclic train, the second electric machine is started to drive the second epicyclic train to output power; or
      a fourth engine mode, wherein the engine is started, but neither the first electric machine nor the second electric machine is started to serve as a power source, instead, the first electric machine and the second electric machine serve as generators.

5. A method for controlling operating modes of a hybrid powertrain mechanism including a first epicyclic train, a second epicyclic train, a first electric machine, a second electric machine, a first clutch, a first brake, a third clutch, and an engine, the method comprising:
   releasing the first clutch;
   engaging the first brake; and
   releasing the third clutch to generate an operating mode that is a second electric mode, wherein when the engine is stopped, the first electric machine is started as a power source to output power through the first epicyclic train and the second electric machine is started to drive the second epicyclic train to output power.

* * * * *